(12) United States Patent
Ishizuka et al.

(10) Patent No.: US 8,090,912 B2
(45) Date of Patent: Jan. 3, 2012

(54) MULTIPROCESSOR SYSTEM, SYSTEM BOARD, AND CACHE REPLACEMENT REQUEST HANDLING METHOD

(75) Inventors: Takaharu Ishizuka, Kawasaki (JP); Toshikazu Ueki, Kawasaki (JP); Makoto Hataida, Kawasaki (JP); Takashi Yamamoto, Kawasaki (JP); Yuka Hosokawa, Kawasaki (JP); Takeshi Owaki, Kawasaki (JP); Daisuke Itou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 560 days.

(21) Appl. No.: 11/790,265

(22) Filed: Apr. 24, 2007

(65) Prior Publication Data
US 2008/0046656 A1 Feb. 21, 2008

(30) Foreign Application Priority Data
Aug. 18, 2006 (JP) ................................. 2006-222990

(51) Int. Cl.
*G06F 12/00* (2006.01)
*G06F 13/00* (2006.01)
*G06F 13/28* (2006.01)

(52) U.S. Cl. ...................................................... 711/133

(58) Field of Classification Search .................... 711/133
See application file for complete search history.

(56) References Cited

U.S. PATENT DOCUMENTS

| | | | | |
|---|---|---|---|---|
| 4,695,943 A | * | 9/1987 | Keeley et al. | 711/140 |
| 5,559,985 A | * | 9/1996 | Maemura | 711/140 |
| 5,875,472 A | * | 2/1999 | Bauman et al. | 711/150 |
| 6,112,283 A | | 8/2000 | Neiger et al. | |
| 6,615,323 B1 | | 9/2003 | Petersen et al. | |
| 2003/0009631 A1 | * | 1/2003 | Arimilli et al. | 711/135 |
| 2003/0217235 A1 | | 11/2003 | Rowlands | |
| 2004/0215896 A1 | * | 10/2004 | McCalpin et al. | 711/144 |
| 2005/0204195 A1 | * | 9/2005 | Edirisooriya et al. | 714/30 |
| 2006/0179174 A1 | * | 8/2006 | Bockhaus et al. | 710/22 |

FOREIGN PATENT DOCUMENTS

| | | |
|---|---|---|
| JP | 2002-522827 A | 7/2002 |
| KR | 2002-0048513 | 6/2002 |

OTHER PUBLICATIONS

Extended European Search Report, mailed Dec. 19, 2007 and issued in corresponding European Patent Application No. 07107214.4-1229.

* cited by examiner

*Primary Examiner* — Sheng-Jen Tsai
(74) *Attorney, Agent, or Firm* — Fujitsu Patent Center

(57) ABSTRACT

A request issued by the CPU is output from the local arbiter by way of the CPU bus and the CPU-issued request queue. The cache replacement request loop-back circuit determines at the loop-back determination circuit whether the outputted request is a cache replacement request or not. A request other than a cache replacement request is output onto the local bus. A cache replacement request is output to the selector and sent to the request handling section when there is no valid request on the global bus.

9 Claims, 13 Drawing Sheets

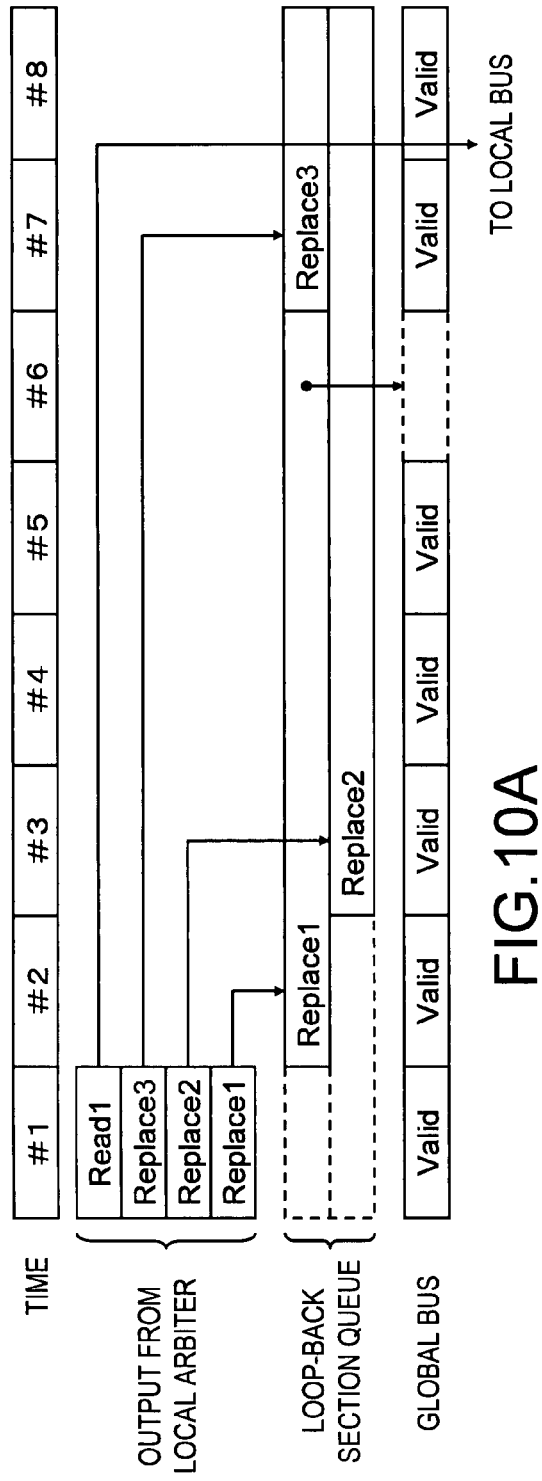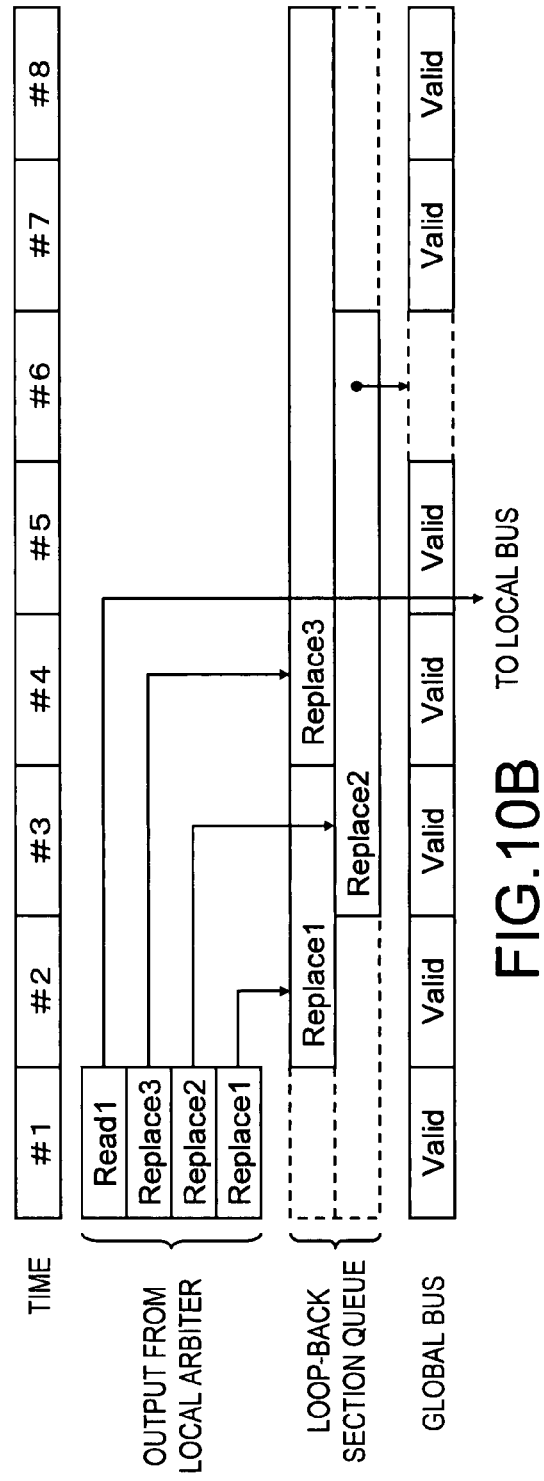

MULTIPROCESSOR SYSTEM, SYSTEM BOARD, AND CACHE REPLACEMENT REQUEST HANDLING METHOD

CROSS-REFERENCE TO RELATED APPLICATIONS

This application claims priority from Japanese patent application Serial no. 2006-222990 filed Aug. 18, 2006, the contents of which are incorporated by reference herein.

BACKGROUND OF THE INVENTION

1. Field of the Invention

The present invention relates to a technique for controlling requests from CPUs in a multiprocessor system. More particularly, the present invention relates to a multiprocessor system, a system board, and a cache replacement request processing method for efficiently handling cache replacement requests.

2. Description of the Related Art

In recent years, with wide utilization of information processing apparatuses in various fields, increasingly high processing capability is required of chip sets in a multiprocessor configuration.

FIG. 11 shows an exemplary configuration of a multiprocessor system. The multiprocessor system shown in FIG. 11 is composed of four system boards 100a to 100d and an address crossbar board 200. Each of the system boards 100a to 100d and the address crossbar board 200 are connected to each other by local buses 300a to 300d, a global bus 301, local signaling paths 302a to 302d, and a global signaling path 303.

The system board 100a has a system controller 110 and four CPUs 120a to 120d. The CPU 120a and the CPU 120b are connected to the system controller 110 by a CPU bus 130a, and the CPU 120c and the CPU 120d by a CPU bus 130c. Other system boards 100b to 100d have a similar configuration as the system board 100a.

The CPUs 120a to 120d have cache memory 121a to 121d and a cache tag 122a to 122d, respectively. This example assumes that the cache memory 121 is controlled in 4-way set associative method.

The system controller 110 has snoop tags 111a to 111d, a CPU-issued request queues 112a and 112c, a local arbiter 113, a request handling section 114, and a request execution section 115.

The snoop tags 111a to 111d correspond to the cache tags 122a to 122d, respectively. The CPU-issued request queue 112 retains requests issued by the CPUs 120 for each of the CPU buses 130. Here, requests issued by the CPUs 120a and 120b are retained in the CPU-issued request queue 112a and ones issued by the CPUs 120c and 120d are retained in the CPU-issued request queue 112c. The local arbiter 113 outputs requests retained in the CPU-issued request queues 112 to the local bus 300a.

The request handling section 114 performs handling of requests sent from the global bus 301. The request handling section 114 has a resource management section 116 and a request execution activating section 117. The resource management section 116 performs checking of resource and the like for handling requests. The request execution activating section 117 activates the request execution section 115 and/or updates the snoop tags 111.

The address crossbar board 200 has a global arbiter 210 and an executability determination circuit 220. The global arbiter 210 outputs requests input from the local buses 300a to 300d to all the system boards 100a to 100d via the global bus 301.

The executability determination circuit 220 determines whether it is possible to execute a request based on a notification inputted from the local signaling paths 302a to 302d and notifies the result and information necessary for executing the request to each of the system boards 100a to 100d via the global signaling path 303.

The operation of the system illustrated in FIG. 11 will be described for a case where the CPU 120a makes a read request. It is assumed here that the CPU 120a performs read from an address of 1000. The MESI protocol is used for cache coherency. The MESI protocol is a kind of cache coherency protocol which controls each line of cache by classifying it as one of M (modified state: Modified), E (exclusive state: Exclusive), S (shared state: Shared), and I (invalid state: Invalid).

To confirm whether data from the address of 1000 is present in its own cache memory 121a, the CPU 120a first searches the cache tag 122a. If it determines from the search that there is no valid data in its own cache memory 121a, the CPU 120a issues a read request onto the CPU bus 130a.

The request issued by the CPU 120a is input to the global arbiter 210 by way of the CPU-issued request queue 112a, the local arbiter 113, and the local bus 300a. The request input to the global arbiter 210 is notified to all the system boards 100a to 100d simultaneously via the global bus 301.

On the system board 110a, the request is input to the request handling section 114 from the global bus 301. The request handling section 114 reads each snoop tag 111 and the resource management section 116 checks if there is resource and the like for handling the request. The result is sent to the executability determination circuit 220 via the local signaling path 302a.

The executability determination circuit 220 determines whether it is possible to execute the request based on notifications from all the local signaling paths 302a to 302d and notifies the result and information necessary for execution of the request to the request execution activating section 117 via the global signaling path 303. The request execution activating section 117 updates the snoop tags 111 and/or activates the request execution section 115 based on the result of determining whether the request can be executed and the information necessary for executing the request.

For example, if resource can be secured and results of searching the snoop tags 111 are all Invalid, the request execution activating section 117 registers address of 1000 in the snoop tag 111a. A state to be registered depends on the issued request. At the same time, the request execution section 115 performs a read from the address of 1000 in memory and sends obtained data to the CPU 120a. The CPU 120a updates the cache tag 122a.

Or, if resource can be secured and searches of the snoop tags 111 show that address of 1000 is registered in the snoop tag 111c as M (Modified), for example, the request execution activating section 117 registers address of 1000 in the snoop tag 111a. A state to be registered depends on the issued request. Also, the state of address of 1000 in the snoop tag 111c is changed to S (Shared) or I (Invalid). The state after the change depends on the issued request. At the same time, the request execution section 115 gives an instruction to the CPU 120c to send M data at address of 1000, and sends the output data to the CPU 120a. The CPU 120a updates the cache tag 122a and the CPU 120c updates the cache tag 122c.

FIG. 12 illustrates an example of handling a cache replacement request. FIG. 12 illustrates a case which gives attention to the system board 100a that mainly includes the CPU 120a, CPU 120b and system controller 110 as well as the address crossbar board 200 that mainly includes the global arbiter 210 in FIG. 11. It is assumed here that the CPU 120a issues a cache replacement request.

Arrows of thick lines in FIG. 12 indicate routes by which a cache replacement request is delivered. A cache replacement request issued by the CPU 120a is delivered to the request handling section 114 of the system controller 110 on each of the system boards 100a to 100d by way of the CPU bus 130a, the CPU-issued request queue 112a, the local arbiter 113, the local bus 300a, the global arbiter 210, and the global bus 310, as with other requests.

FIG. 13 illustrates Eviction. Eviction refers to an instruction to discharge contents in cache given from the system controller 110 side to the CPU 120. Eviction will be described below with reference to the example shown in FIG. 13.

First, as illustrated at phase 0, assume that a certain common index of both the cache tag 122 and the snoop tag 111 is empty. If the CPU 120 reads address A in this state, address A is registered to both the cache tag 122 and the snoop tag 111 as illustrated at phase 1. As the CPU 120 further continues to read addresses B, C and D of the same index, it results in way-full as illustrated at phase 2.

If the CPU 120 further wants to read address E of the same index in this way-full state, any one piece of data in the cache tag 122 has to be deleted first. Assume that address A is deleted here. If the CPU 120 does not support cache replacement requests and the state of address A is not M (Modified), silent drop of address A occurs in the CPU 120. As illustrated at phase 3, address A in the cache tag 122 is deleted. Silent drop means deletion of data without notifying it externally.

Similarly, because the system controller 110 also should register address E in response to the read of address E by the CPU 120, any one piece of data has to be deleted from the snoop tag 111. It is assumed here that address B is deleted. At this point, because of a rule of inclusion that "what is present in the cache tag 122 must be present in the snoop tag 111", the system controller 110 should have the CPU 120 delete what it deleted, so the system controller 110 has to issue an unload request to the CPU 120 as illustrated at phase 4. This unload request is called Eviction. As both the cache tag 122 and the snoop tag 111 will finally have an available space, address E can be registered in both of them as illustrated at phase 5.

Documents on conventional arts that describe techniques associated with multiprocessor systems include Patent Document 1 (National Publication of International Patent Application No. 2002-522827), for example. Patent Document 1 describes a technique for a multiprocessor computer system in which nodes are coupled to each other in a ring. However, the technique described in Patent Document 1 cannot solve problems mentioned below.

A multiprocessor system consisting of a number of system boards 100 has a problem that very heavy burden is placed on the global bus 301 and, when a cache replacement request is flowed on the global bus 301, the capability to handle other requests reduces. Another problem is that, because a cache replacement request could lead to occurrence of Eviction if it is not handled before a read request which is its parent, intended effect of the cache replacement request may not be obtained in such a situation.

SUMMARY OF THE INVENTION

An object of the present invention to provide a technique that can prevent burden due to a cache replacement request from being placed on a global bus and prevent occurrence of unnecessary Eviction.

The present invention is a multiprocessor system which is characterized in that, when a request issued by a CPU on a system board is a cache replacement request, the system board does not send the request to an address crossbar board but loops it back within the system board to handle it.

Specifically, the present invention is a multiprocessor system that includes a plurality of system boards each of which has CPUs and a request handing section for handling requests issued by the CPUs, and an address crossbar board that provides arbitration of requests from the system boards, characterized in that each of the system boards includes a cache replacement request loop-back circuit that determines whether a request issued by a CPU on that system board is a cache replacement request or not, and if the request is not a cache replacement request, sends the request to the address crossbar board, and if the request is a cache replacement request, sends the request from within the system board to the request handling section.

Consequently, since cache replacement requests are not output onto the global bus, burden on the global bus can be reduced in terms of throughput. In addition, because a cache replacement request is looped back within the system board on which it originated and handled before a read request which is its parent, occurrence of unnecessary Eviction can be prevented.

Also, the present invention is the multiprocessor system described above, characterized in that the cache replacement request loop-back circuit includes a loop-back section queue that retains cache replacement requests issued by the CPUs on the same system board. This can prevent delay in issuance of a request other than a cache replacement request even when the global bus is busy and a cache replacement request cannot be handled immediately.

Also, the present invention is the multiprocessor system described above, characterized in that, if a cache replacement request is newly issued by a CPU on the system board when all the entries of the loop-back section queue already retain cache replacement requests, the cache replacement request loop-back circuit overwrites a cache replacement request retained in any one entry of the loop-back section queue with the newly issued cache replacement request. This can effectively prevent delay in issuance of a request other than a cache replacement request even if the loop-back section queue has a small number of entries.

The present invention can prevent burden due to a cache replacement request from being placed on a global bus and prevent occurrence of unnecessary Eviction. Consequently, cache replacement requests can be handled efficiently and system performance is increased.

BRIEF DESCRIPTION OF THE DRAWINGS

FIGS. 10A and 10B illustrate the effect obtained when the loop-back section queue has overwriting function;

DETAILED DESCRIPTION OF THE PREFERRED EMBODIMENTS

Figure 1:
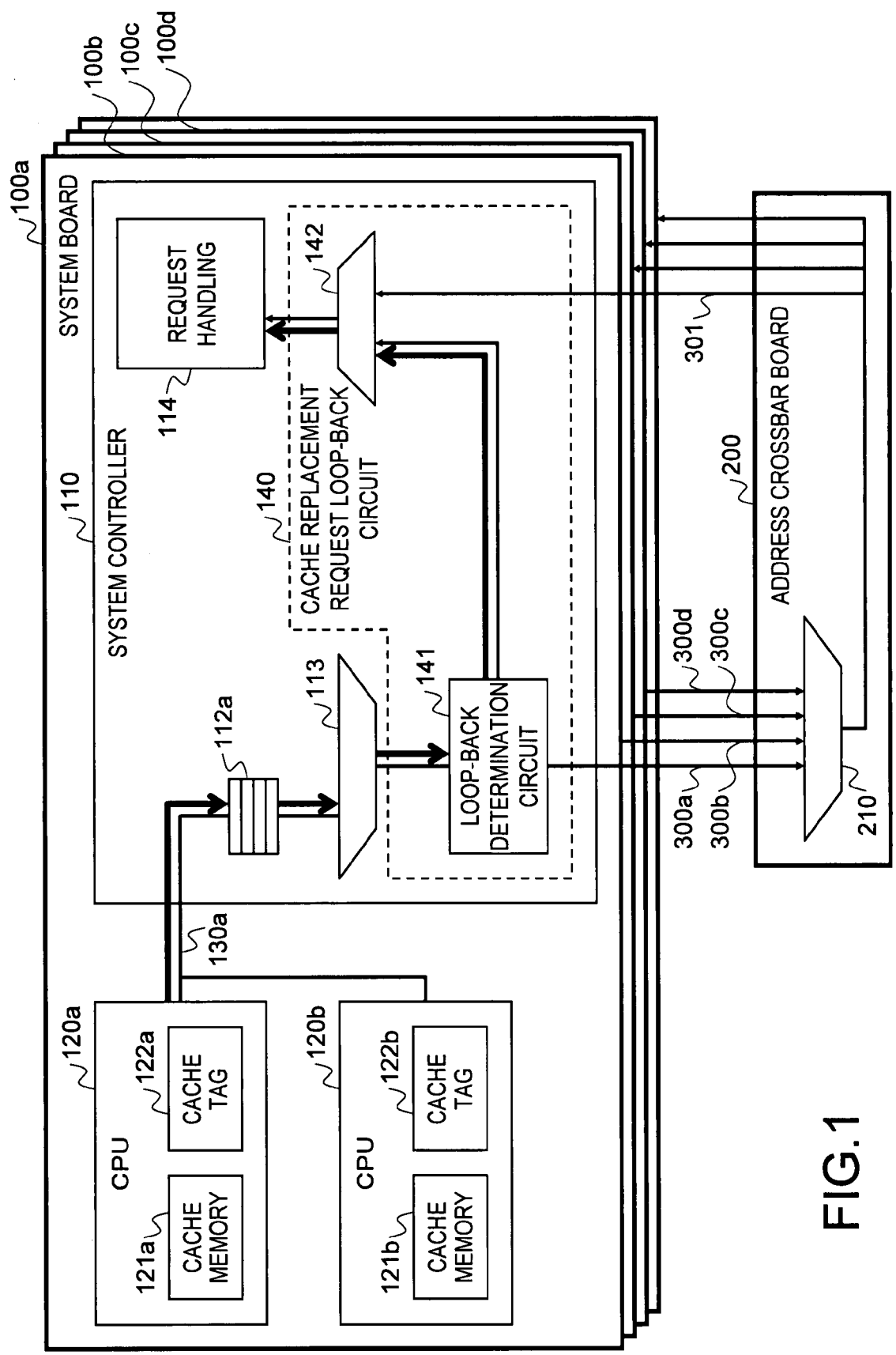
FIG. 1 shows an exemplary configuration of a multiprocessor system according to an embodiment.
Figure 11:
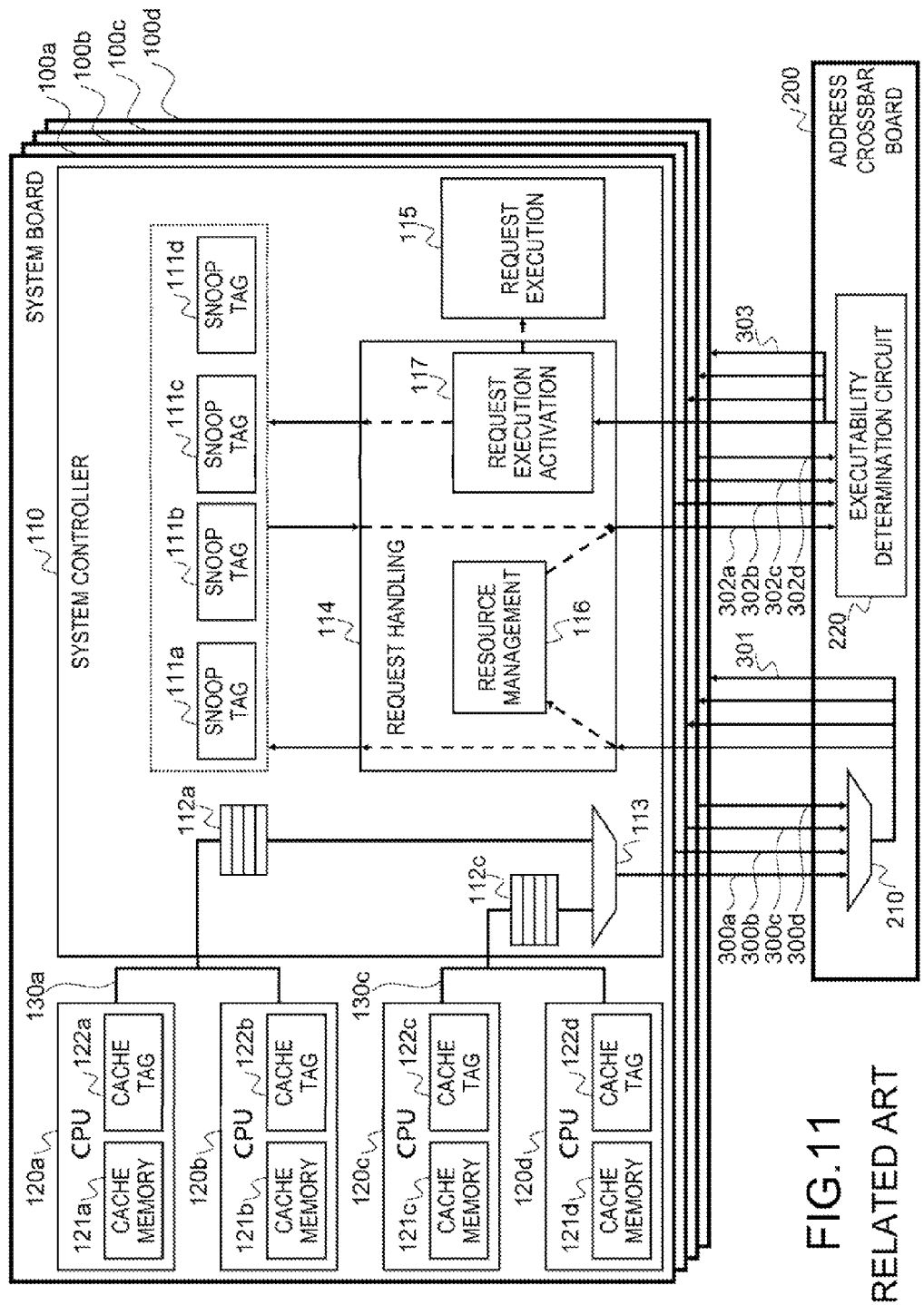
FIG. 11 shows an exemplary configuration of a multiprocessor system.
Figure 12:
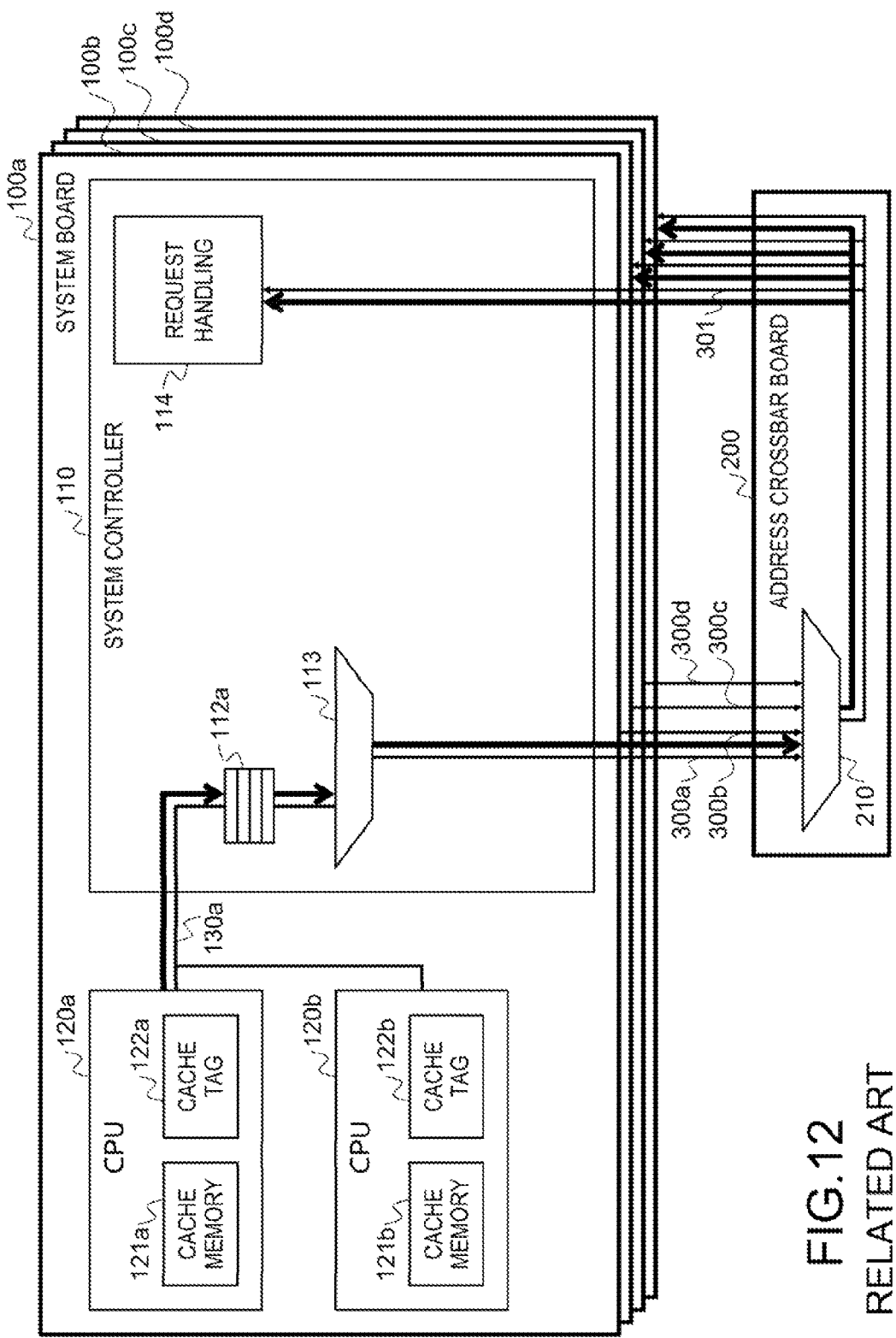
FIG. 12 illustrates an example of handling of a cache replacement request.
Figure 13:
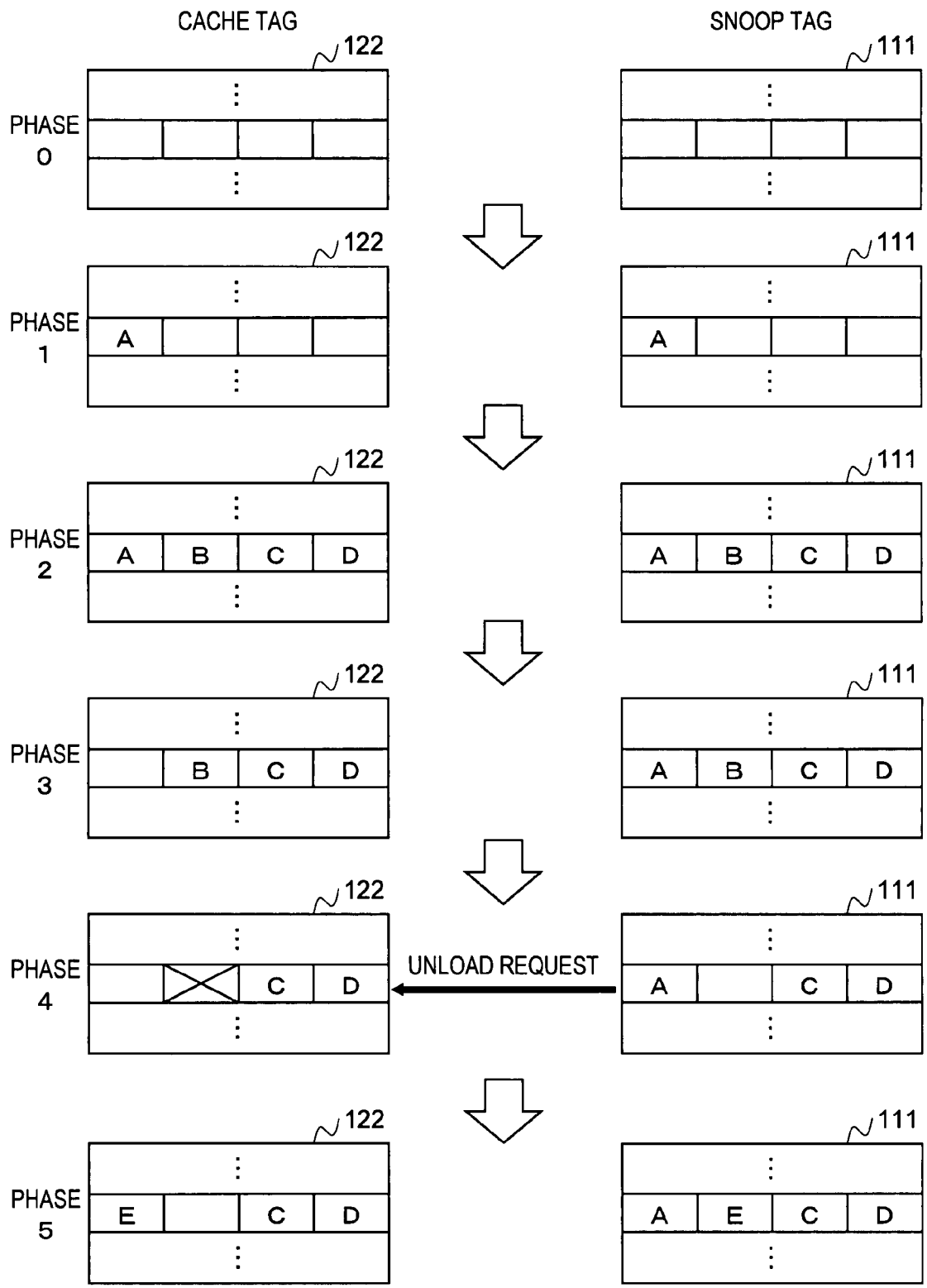
FIG. 13 illustrates Eviction.

FIG. 1 shows an exemplary configuration of a multiprocessor system according to an embodiment of the present invention. The multiprocessor system shown in FIG. 1 focuses on the system board 100 that mainly includes the CPU 120a, CPU 120b and the system controller 110 as well as the address crossbar board 200 that mainly includes the global arbiter 210 of the configuration shown in FIG. 11. Other components are omitted as they are similar to ones of conventional arts.

The multiprocessor system shown in FIG. 1 consists of four system boards 100a to 100d and an address crossbar board 200. Each of the system boards 100a to 100d and the address crossbar board 200 are connected to each other by local buses 300a to 300d, a global bus 301 and so forth.

The system boards 100a has a system controller 110 and two CPUs 120a and 120b. The two CPUs 120a and 120b are connected to the system controller 110 by a CPU bus 130a. Other system boards 100b to 100d have a similar configuration as the system board 100a.

The CPUs 120a and 120b have cache memory 121a and 121b and a cache tag 122a and 122b, respectively. In this embodiment, the cache memory 121 is controlled in 4-way set associative method.

The system controller 110 includes a CPU-issued request queue 112a, a local arbiter 113, a request handling section 114, and a cache replacement request loop-back circuit 140.

The CPU-issued request queue 112a retains requests issued by the CPUs 120a and 120b. The local arbiter 113 outputs requests retained in the CPU-issued request queue 112a onto the local bus 300a. The request handling section 114 processes requests issued by the CPUs 120.

The cache replacement request loop-back circuit 140 is means for looping back only cache replacement requests within the system controller 110 and sending them to the request handling section 114 and includes a loop-back determination circuit 141 and a selector 142. The loop-back determination circuit 141 classifies requests issued by the local arbiter 113 as cache replacement requests that will be looped back within the system controller 110 and requests other than cache replacement requests that will be output to the local bus 300a. If there is a valid request on the global bus 301, the selector 142 sends it to the request handling section 114, and if there is no valid request on the global bus 301, the selector 142 sends a cache replacement request to the request handling section 114.

The address crossbar board 200 has a global arbiter 210. The global arbiter 210 outputs requests inputted from the local buses 300a to 300d to all the system boards 100a to 100d via the global bus 301.

In FIG. 1, arrows of thick lines indicate a route by which a cache replacement request is delivered. It is assumed here that the CPU 120a issues a cache replacement request. The cache replacement request issued by the CPU 120a is delivered to the request handling section 114 by way of the CPU bus 130a, the CPU-issued request queue 112a, the local arbiter 113, the loop-back determination circuit 141, and the selector 142. A request other than a cache replacement request such as a read request is input from the local bus 300a to the selector 142 of each system board 100a to 100d via the global arbiter 210 and the global bus 301.

Unlike other requests, a cache replacement request does not go through the address crossbar board 200. Since a cache replacement request is an instruction to set an appropriate address in the snoop tag 111 corresponding to the issuing CPU 120 to I (Invalid), it is not necessary to deliver it outside the system board 100 concerned.

Figure 2:
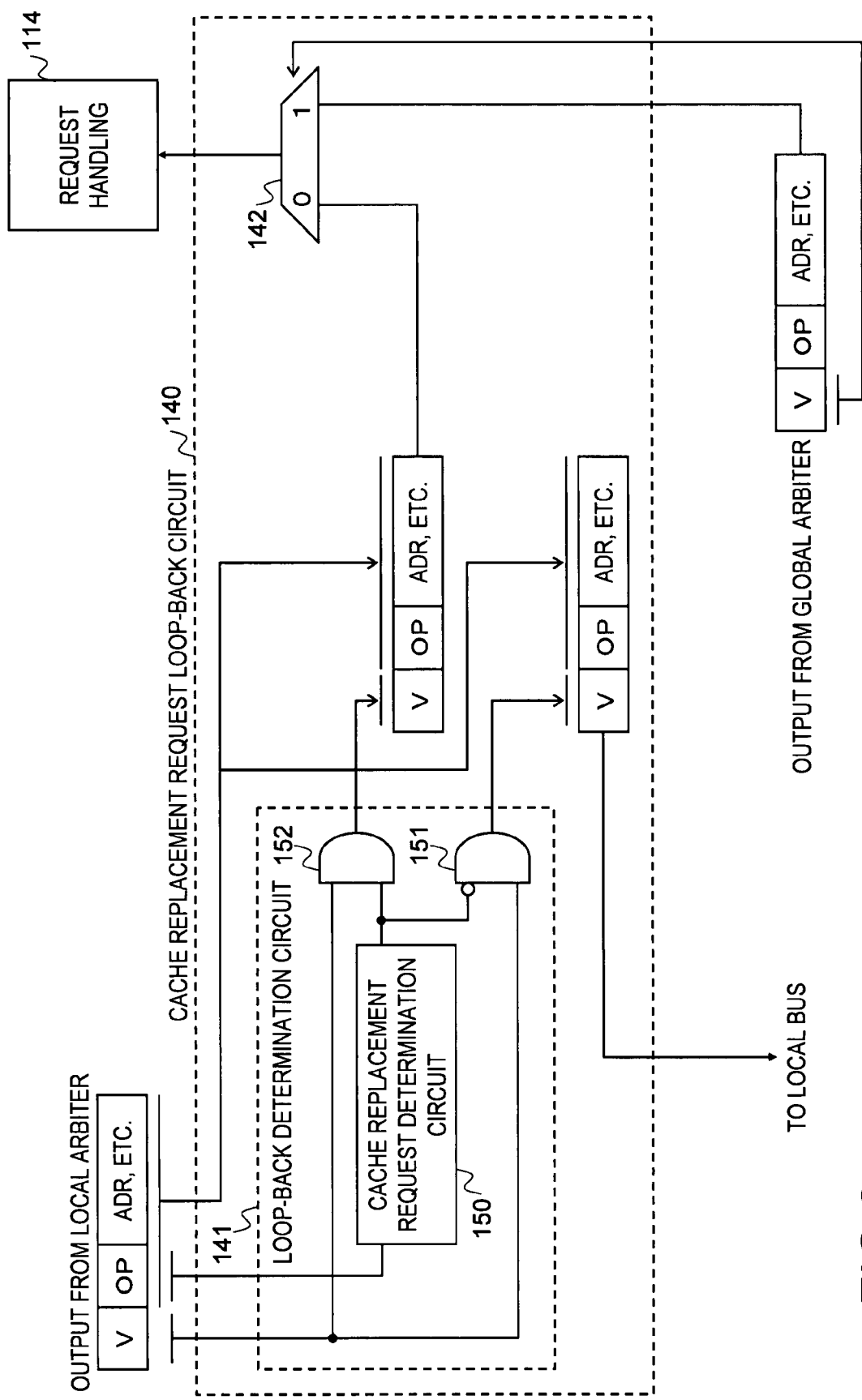
FIG. 2 illustrates an example of a cache replacement request loop-back circuit.

FIG. 2 illustrates an example of the cache replacement request loop-back circuit. A signal for a request issued by the local arbiter 113 consists of valid signal (V), an operation code (OP), an address and so forth (ADR, etc). The loop-back determination circuit 141 includes a cache replacement request determination circuit 150, an AND circuit 151, and an AND circuit 152.

The cache replacement request determination circuit 150 determines whether a request is a cache replacement request or not based on the operation code (OP) of the request issued by the local arbiter 113. If the request is a cache replacement request, the circuit 150 sends a valid signal, and if the request is not a cache replacement request, it sends an invalid signal. The AND circuit 151 receives a signal from the cache replacement request determination circuit 150 inversing it and the AND circuit 152 receives a signal from the cache replacement request determination circuit 150 as it is.

The AND circuit 151 sends a valid signal if the valid signal (V) for a request issued by the local arbiter 113 is valid and inversion of a signal from the cache replacement request determination circuit 150 is valid. Otherwise, it sends an invalid signal. A signal for a request consisting of valid signal (V) sent from the AND circuit 151, the operation code (OP) of the request issued by the local arbiter 113, and an address and so forth (ADR, etc) is output onto the local bus 300.

The AND circuit 152 sends a valid signal if the valid signal (V) for a request issued by the local arbiter 113 is valid and a signal from the cache replacement request determination circuit 150 is valid. Otherwise, it sends an invalid signal. The signal for the request consisting of valid signal (V) sent by the AND circuit 152, the operation code (OP) of the request issued by the local arbiter 113, an address and so forth (ADR, etc) is output to the selector 142.

If the valid signal (V) for a request output from the global arbiter 210 is valid "1", the selector 142 sends the request (other than cache replacement requests) outputted by the global arbiter 210 to the request handling section 114. If the valid signal (V) for the request output by the global arbiter 210 is invalid "0", that is, there is a space on the global bus 301, the selector sends a request (a cache replacement request) outputted by the loop-back determination circuit 141 to the request handling section 114.

Figure 3:
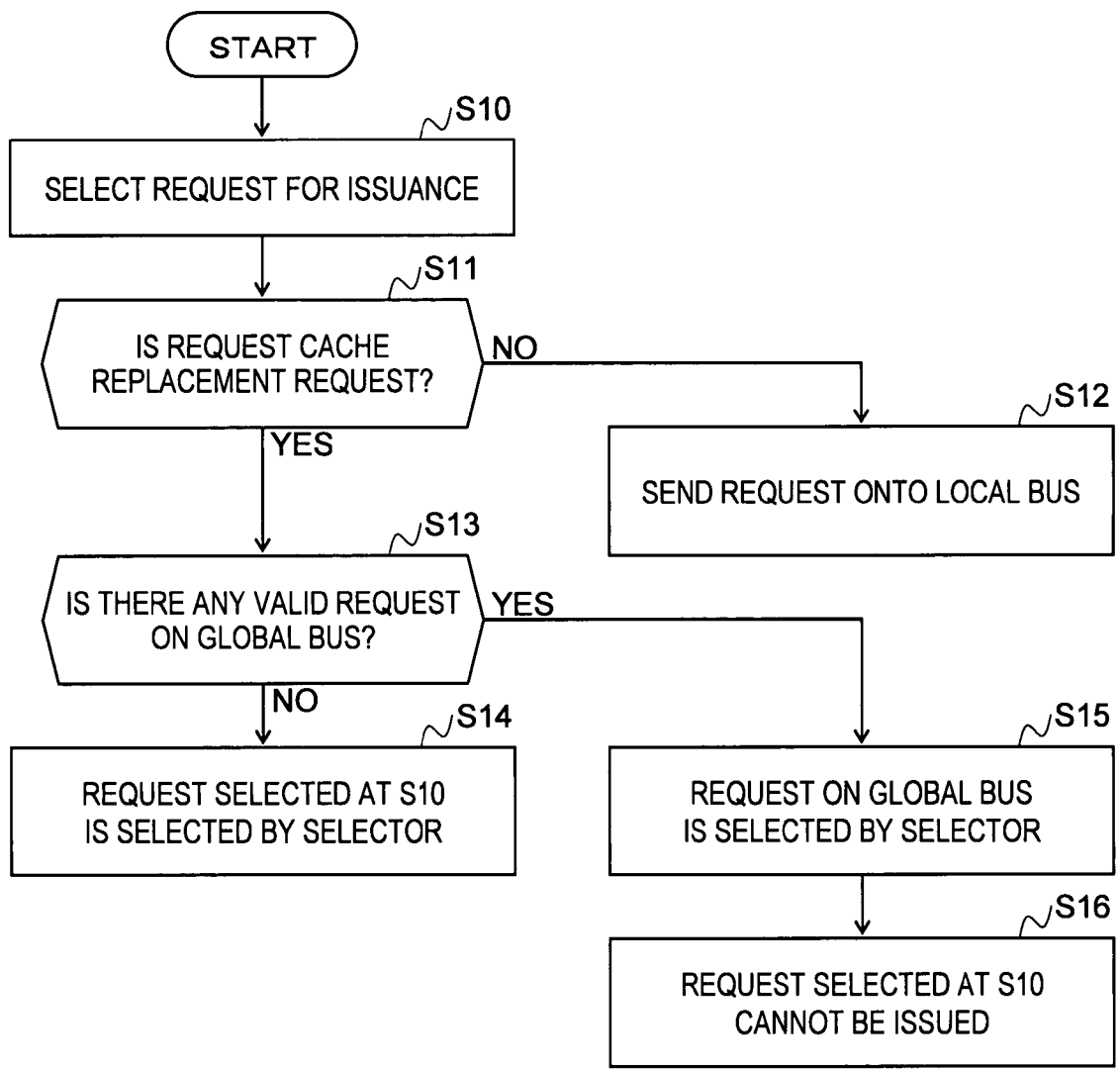
FIG. 3 is a flowchart illustrating cache replacement request loop-back.

FIG. 3 is a flowchart illustrating the process of looping back a cache replacement request in this embodiment. When the local arbiter 113 selects a request that will be issued to the local bus 300 (step S10), the cache replacement request loop-back circuit 140 determines whether the selected request is a cache replacement request or not (step S11). If the selected request is not a cache replacement request, the selected request is sent onto the local bus 300 (step S12).

If the selected request is a cache replacement request at the determination at step S11, determination is made as to whether there is a valid request on the global bus 301 (step S13). If there is no valid request on the global bus 301, the request selected at step S10 (a cache replacement request) is selected by the selector 142 (step S14).

If there is a valid request on the global bus 301 at the determination at step S13, the request on the global bus 301 is selected by the selector 142 (step S15). At this point, the request selected at step S10 (a cache replacement request) cannot be issued (step S16). Its issuance is postponed to the next time or later.

Figure 4A:
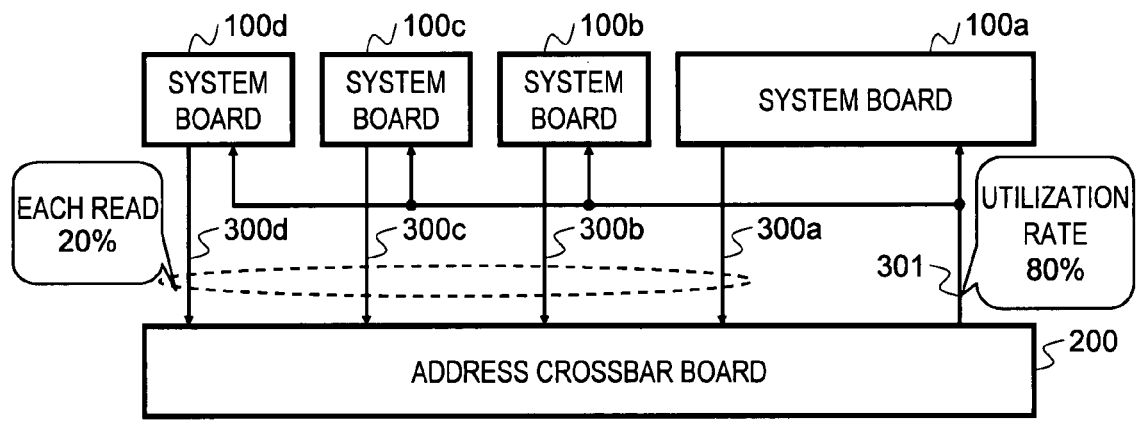
FIGS. 4A, 4B and 4C illustrate the effect of looping back a cache replacement request within a system controller.
Figure 4B:
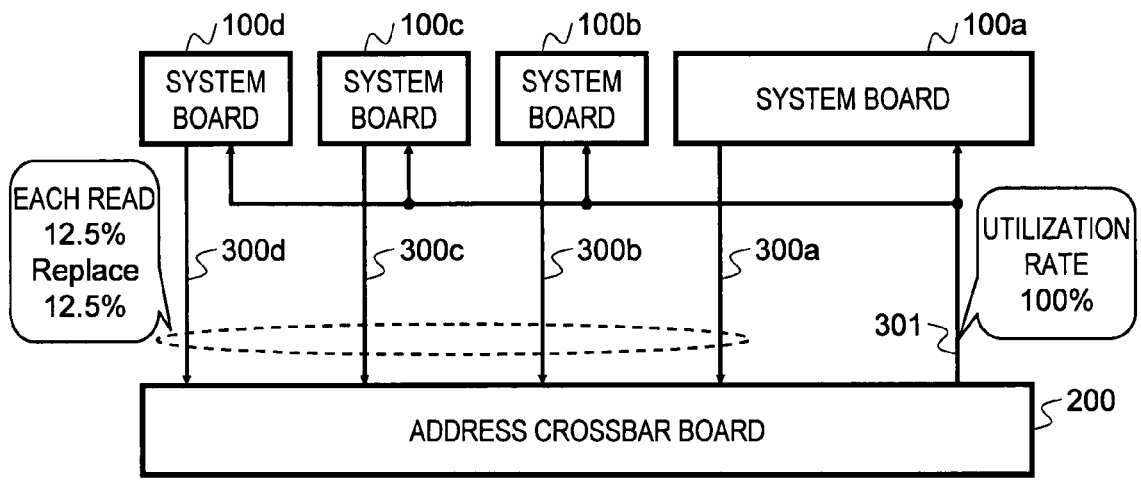
Figure 4C:
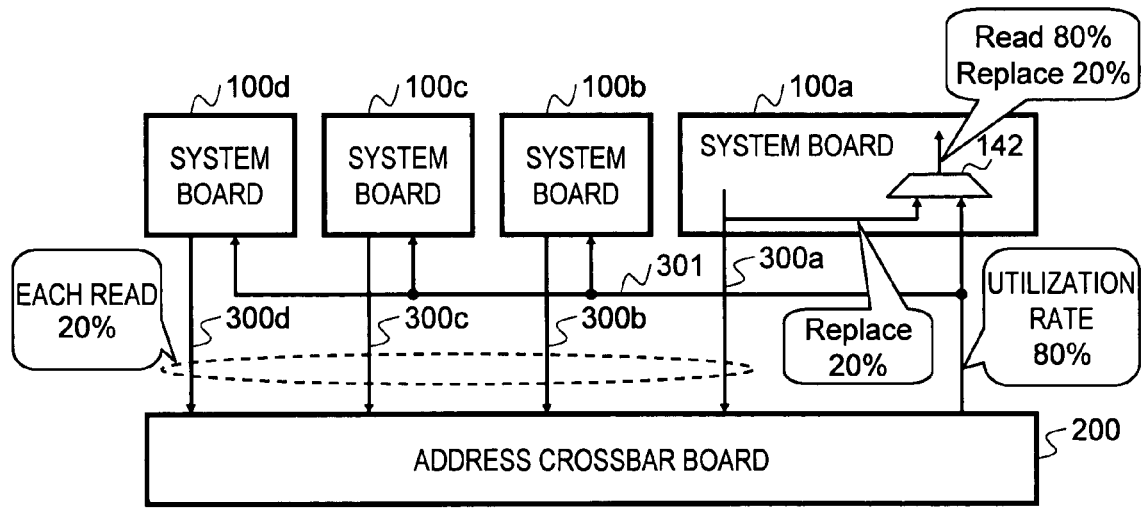

FIGS. 4A, 4B and 4C illustrate the effect of looping back a cache replacement request within the system controller. In FIGS. 4A, 4B and 4C, "Read" refers to a read request and "Replace" refers to a cache replacement request.

Assuming that each of the system boards 100a to 100d issues a read request that accounts for 20% of utilization of the global bus 301 as illustrated in FIG. 4A, the total utilization rate of the global bus 301 will be 80%.

Then, assume that each of the system boards 100a to 100d further issues a cache replacement request that accounts for 20% of utilization of the global bus 301 simultaneously with the read requests. If the system boards 100 do not include the cache replacement request loop-back circuit 140, the cache replacement requests are delivered to the local bus 300, address crossbar board 200 and global bus 301 as with a read request. Assuming that all the requests flow onto the global bus 301 simultaneously, the total utilization rate is:

([utilization rate for Read]+[utilization rate for Replace])×[the number of system boards]=(20+20)×4=160[%]

which exceeds the throughput of the global bus 301. Consequently, read capability drops to as low as 12.5% as illustrated in FIG. 4B.

On the other hand, when the system board 100 has the cache replacement request loop-back circuit 140, cache replacement requests do not flow onto the global bus 301 and thus the performance of the global bus 301 does not reduce. As illustrated in FIG. 4C, cache replacement requests are looped back within the system board 100. Performance of the global bus 301 is maintained at 80% and there will be no performance degradation because cache replacement requests looped back within the system board 100 are merged in available 20% by the selector 142.

Figure 5:
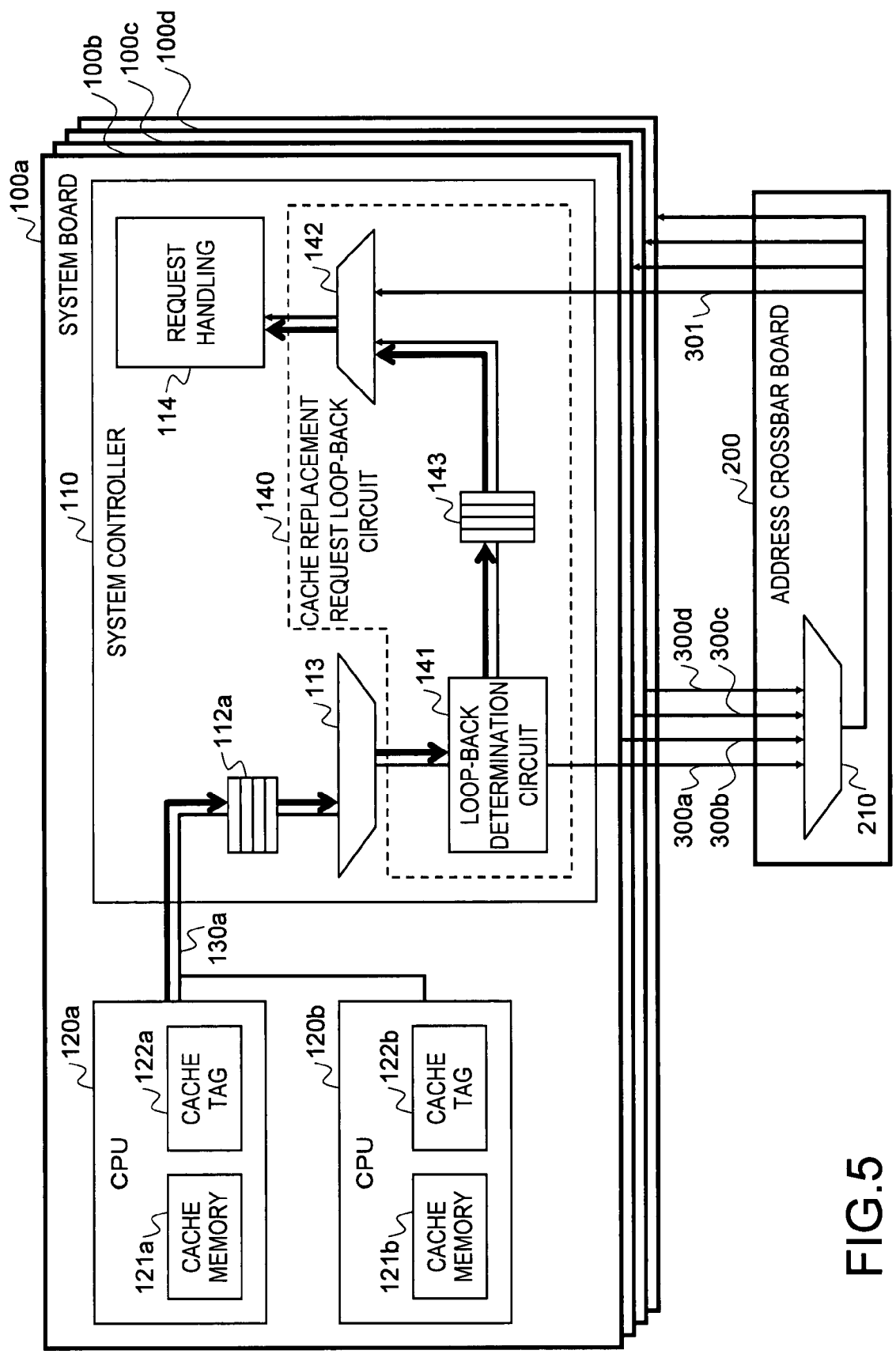
FIG. 5 shows an exemplary configuration of the multiprocessor system according to the embodiment.

FIG. 5 illustrates an exemplary configuration of the multiprocessor system according to the embodiment. The multiprocessor system shown in FIG. 5 further has a loop-back section queue 143 which is provided in the cache replacement request loop-back circuit 140 of the configuration shown in FIG. 1. The loop-back section queue 143 retains cache replacement requests output by the local arbiter 113.

In FIG. 5, arrows of thick lines indicate a route by which a cache replacement request is delivered. It is assumed here that the CPU 120a issues a cache replacement request. The cache replacement request issued by the CPU 120a is retained in the loop-back section queue 143 by way of the CPU bus 130a, the CPU-issued request queue 112a, the local arbiter 113, and the loop-back determination circuit 141. The selector 142 sends cache replacement request retained in the loop-back section queue 143 to the request handling section 114 when there is no valid request on the global bus 301.

Figure 6:
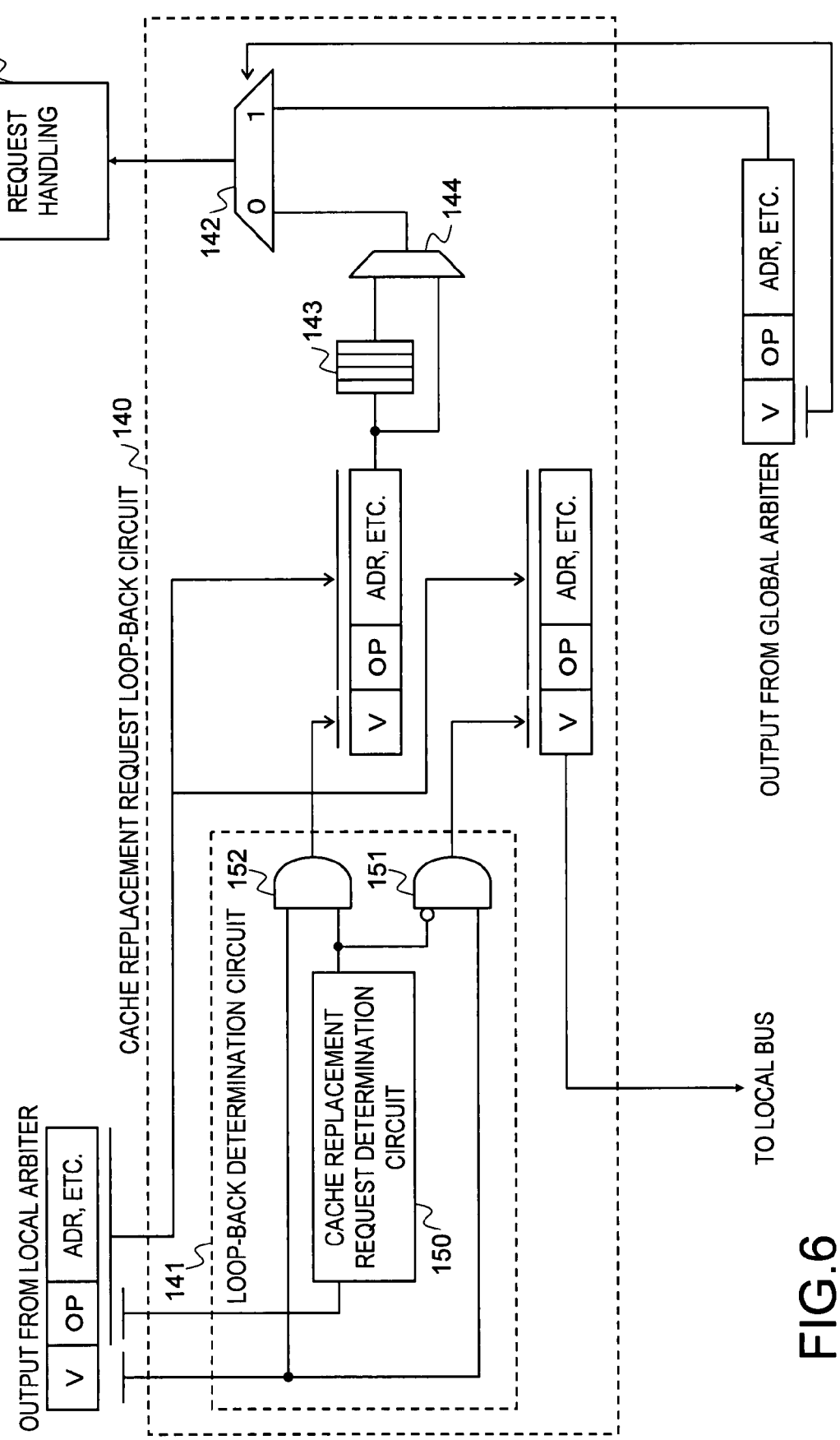
FIG. 6 illustrates an example of a cache replacement request loop-back circuit.

FIG. 6 illustrates an example of the cache replacement request loop-back circuit. The loop-back determination circuit 141 shown in FIG. 6 operates in a similar way to the loop-back determination circuit 141 shown in FIG. 2. However, a signal for a request consisting of valid signal (V) sent from the AND circuit 152, an operation code (OP) of the request issued by the local arbiter 113, an address and so forth (ADR, etc.) is retained in the loop-back section queue 143. When the valid signal (V) for a request outputted by the global arbiter 210 is invalid "0" and when the loop-back section queue 143 is empty, a cache replacement request is not retained in the loop-back section queue 143 but is sent to the selector 142 via the selector 144.

If the valid signal (V) for the request output by the global arbiter 210 is valid "1", the selector 142 sends the request outputted by the global arbiter 210 (other than cache replacement requests) to the request handling section 114. If the valid signal (V) for the request output by the global arbiter 210 is invalid "0", the selector 142 sends a request retained in the loop-back section queue 143 (a cache replacement request) to the request handling section 114.

Figure 7:
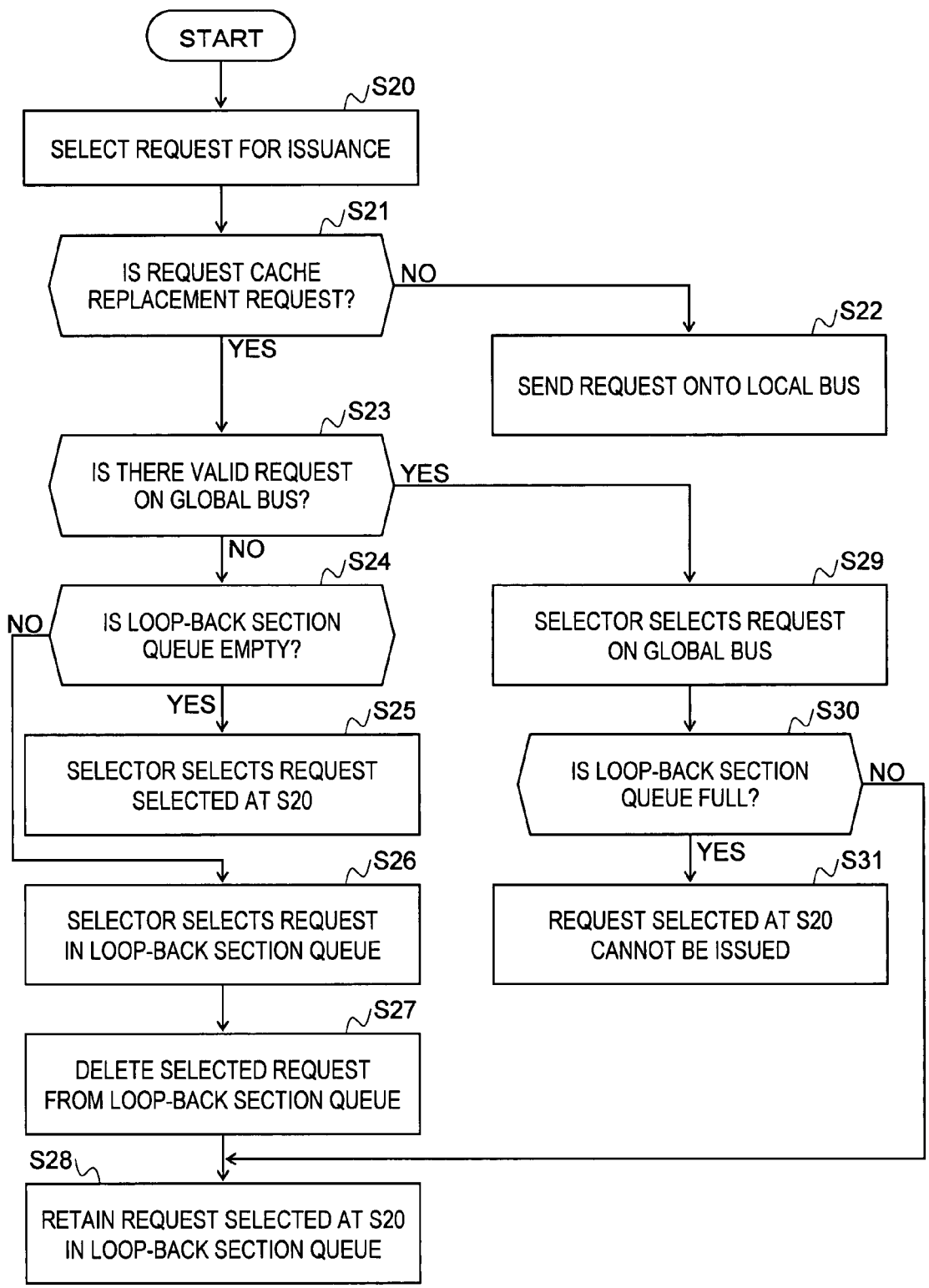
FIG. 7 is a flowchart illustrating the process of looping back a cache replacement request.

FIG. 7 shows a flowchart illustrating the process of looping back a cache replacement request according to the embodiment. The function of the selector 144 shown in FIG. 6 will be described being included in the selector 142.

The local arbiter 113 selects a request to be issued onto the local bus 300 (step S20). The cache replacement request loop-back circuit 140 determines if the selected request is a cache replacement request or not (step S21). If the selected request is not a cache replacement request, the cache replacement request loop-back circuit 140 sends the selected request onto the local bus 300 (step S22).

If the selected request is a cache replacement request at the determination at step S21, it is determined whether there is a valid request on the global bus 301 (step S23). If there is no valid request on the global bus 301 and the loop-back section queue 143 is empty (YES at step S24), the request selected at step S20 (a cache replacement request) is selected by the selector 142 and sent to the request handling section 114 (step S25).

If the loop-back section queue 143 is not empty (NO at step S24), a request retained in the loop-back section queue 143 (a cache replacement request) is selected by the selector 142 (step S26), and the selected request is deleted from the loop-back section queue 143 (step S27). The request selected at step S20 is retained in the loop-back section queue 143 (step S28).

If there is a valid request on the global bus 301 at the determination at step S23, the request on the global bus 301 is selected by the selector 142 and sent to the request handling section 114 (step S29). If the loop-back section queue 143 is not full at this time (NO at step S30), the request selected at step S20 is retained in the loop-back section queue 143 (step S28).

If the loop-back section queue 143 is full (YES at step S30), the request selected at step S20 (a cache replacement request) cannot be issued (step S31). Issuance of the request is postponed to the next time or later.

Figure 8A:
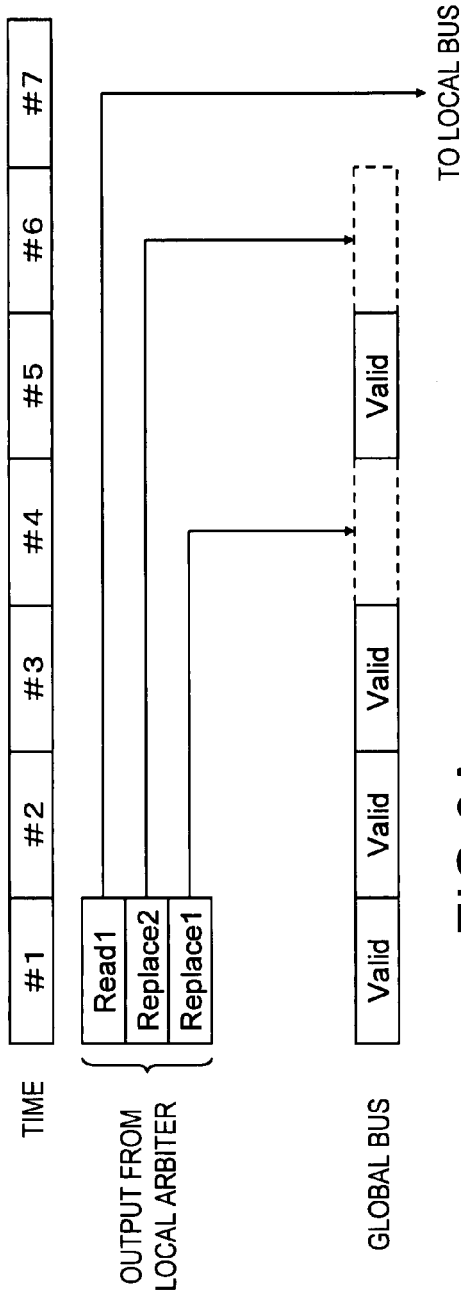
FIGS. 8A and 8B illustrate the effect of providing a loop-back section queue in the cache replacement request loop-back circuit.
Figure 8B:
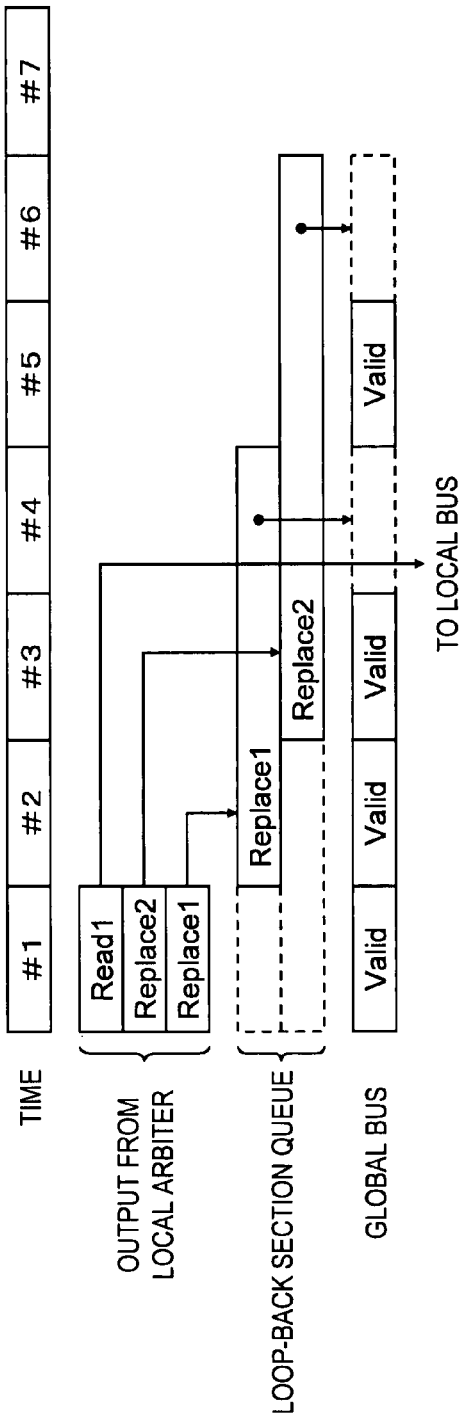

FIGS. 8A and 8B illustrate the effect of providing the loop-back section queue in the cache replacement request loop-back circuit. FIG. 8A illustrates a case where the loop-back section queue 143 is not provided in the cache replacement request loop-back circuit 140, whereas FIG. 8B illustrates a case where the loop-back section queue 143 is provided in the cache replacement request loop-back circuit 140. In FIGS. 8A and 8B, horizontally arranged figures denote progress of time. In this case, requests can be issued from the local arbiter 113 at time #1 in the order of a cache replacement request (Replace 1), a cache replacement request (Replace 2) and a read request (Read 1). "Valid" on the global bus 301 means that there is a valid request on the global bus 301 at the time.

When the loop-back section queue 143 does not have the cache replacement request loop-back circuit 140, it is impossible to temporarily retain a cache replacement request. Thus, as illustrated in FIG. 8A, the cache replacement request (Replace 1) is sent from the selector 142 to the request handling section 114 for the first time at time #4 when there is no valid request on the global bus 301. Similarly, the cache replacement request (Replace 2) is sent from the selector 142 to the request handling section 114 at time #6. The read request (Read 1) is output onto the local bus 300 as late as at time #7.

Thus, when the cache replacement request loop-back circuit 140 does not have the loop-back section queue 143, issuance of the read request is delayed.

On the other hand, when the loop-back section queue 143 is provided in the cache replacement request loop-back circuit 140, the cache replacement request (Replace 1) is retained in the loop-back section queue 143 at time #2 regardless of whether there is a valid request on the global bus 301 or not as illustrated in FIG. 8B. The cache replacement request (Replace 1) retained in the loop-back section queue 143 is sent from the selector 142 to the request handling section 114 at time #4 when there is no valid request on the global bus 301. Similarly, the cache replacement request (Replace 2) is retained in the loop-back section queue 143 at time #3 and sent from the selector 142 to the request handling section 114 at time #6. The read request (Read 1) is output to the local bus 300 at time #4.

Thus, by providing the loop-back section queue 143 in the cache replacement request loop-back circuit 140, it is not necessary for the local arbiter 113 to wait for issuance of a cache replacement request, and thus issuance of a read request can be expedited.

While the description so far assumed that the loop-back section queue 143 does not have overwriting function, the loop-back section queue 143 may have overwriting function. In the configurations shown in FIGS. 5 and 6, if a cache replacement request is newly issued from the local arbiter 113 when the entries of the loop-back section queue 143 are full, a cache replacement request in one entry is deleted in the loop-back section queue 143 and the newly issued cache replacement request is retained therein. By providing the loop-back section queue 143 with overwriting function, the entries of the loop-back section queue 143 can be reduced.

Figure 9:
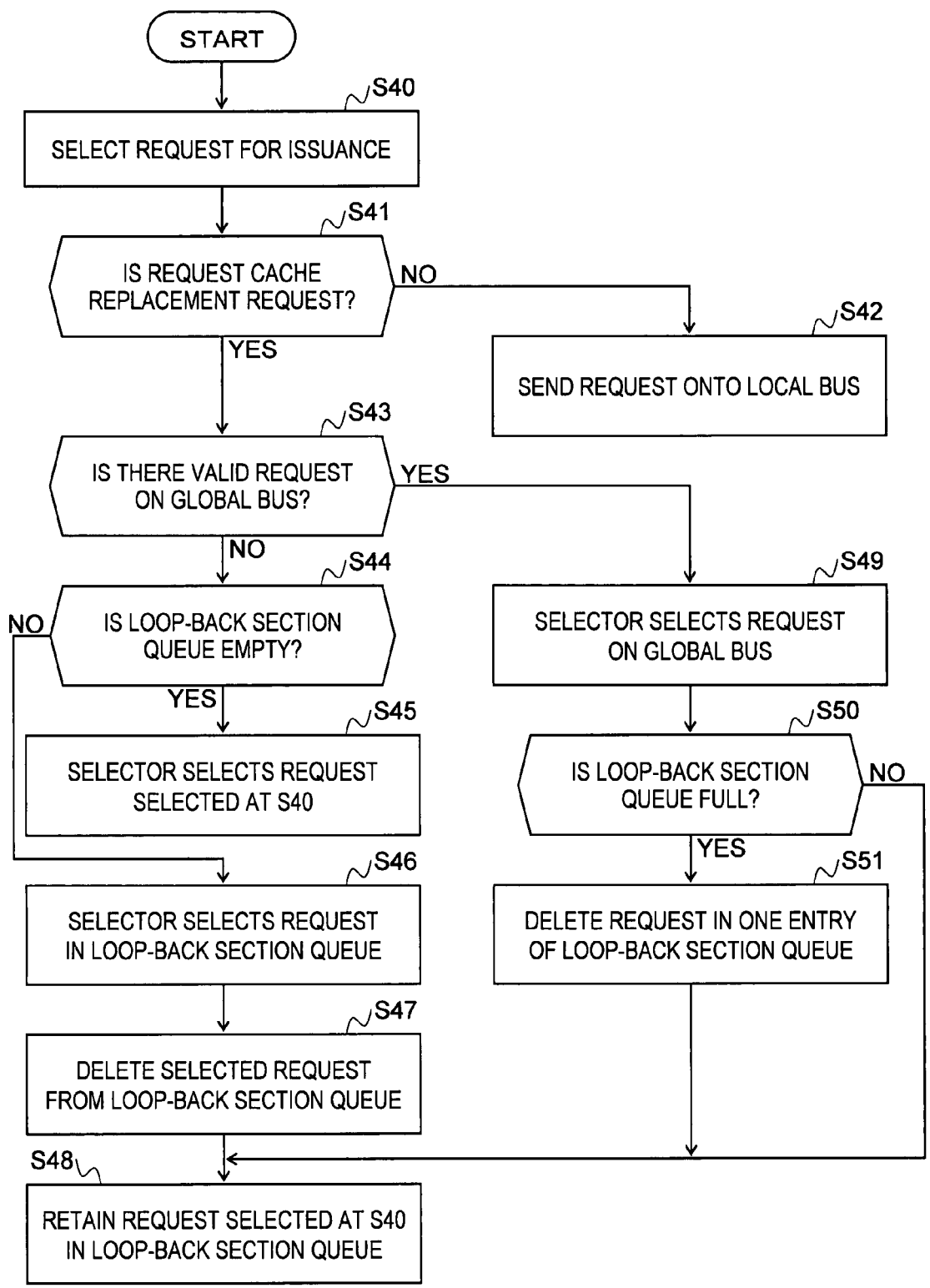
FIG. 9 is a flowchart illustrating the process of looping back a cache replacement request.

FIG. 9 shows a flowchart illustrating the process of looping back a cache replacement request in this embodiment. The function of the selector 144 shown in FIG. 6 will be described herein being included in the selector 142.

When the local arbiter 113 selects a request to be issued onto the local bus 300 (step S40), the cache replacement request loop-back circuit 140 determines whether the selected request is a cache replacement request or not (step S41). If the selected request is not a cache replacement request, the selected request is sent onto the local bus 300 (step S42).

If the selected request is a cache replacement request at the determination at step S41, it is determined whether there is a valid request on the global bus 301 (step S43). If there is no valid request on the global bus 301 and the loop-back section queue 143 is empty (YES at step S44), the request selected at step S40 (a cache replacement request) is selected by the selector 142 and sent to the request handling section 114 (step S45).

If the loop-back section queue 143 is not empty (NO at step S44), a request retained in the loop-back section queue 143 (a cache replacement request) is selected by the selector 142 and sent to the request handling section 114 (step S46), and the selected request is deleted from the loop-back section queue 143 (step S47). The request selected at step S40 is retained in the loop-back section queue 143 (step S48).

If there is a valid request on the global bus 301 (YES at step S43), that request on the global bus 301 is selected by the selector 142 and sent to the request handling section 114 (step S49). If the loop-back section queue 143 is not full then (NO at step S50), the request selected at step S40 is retained in the loop-back section queue 143 (step S48).

If the loop-back section queue 143 is full (YES at step S50), a request in one entry is deleted in the loop-back section queue 143 (step S51), and the request selected at step S40 is retained in the loop-back section queue 143 (step S48).

FIGS. 10A and 10B illustrate the effect obtained when the loop-back section queue has overwriting function. FIG. 10A illustrates a case where the loop-back section queue 143 does not have overwriting function, whereas FIG. 10B illustrates a case where the loop-back section queue 143 has overwriting function. In FIGS. 10A and 10B, horizontally arranged figures denote progress of time. In this example, requests can be output from the local arbiter 113 at time #1 in the order of a cache replacement request (Replace 1), a cache replacement request (Replace 2), a cache replacement request (Replace 3), and a read request (Read 1). "Valid" on the global bus 301 means that there is a valid request on the global bus 301 at the time. It is assumed that the loop-back section queue 143 has two entries.

When the loop-back section queue 143 does not have overwriting function, the cache replacement request (Replace 1) is retained in the loop-back section queue 143 at time #2, and similarly, the cache replacement request (Replace 2) is retained in the loop-back section queue 143 at time #3 as illustrated in FIG. 10A.

Because the loop-back section queue 143 has no more available entry now, the cache replacement request (Replace 3) cannot be output from the local arbiter 113. The cache replacement request (Replace 1) retained in the loop-back section queue 143 is sent from the selector 142 to the request handling section 114 at time #6 when there is no valid request on the global bus 301. The cache replacement request (Replace 3) is finally retained in the loop-back section queue 143 at time #7 and the read request (Read 1) is output onto the local bus 300 at time #8.

Thus, when the loop-back section queue 143 does not have overwriting function, issuance of a read request is delayed when there is no space in the loop-back section queue 143.

On the other hand, when the loop-back section queue 143 has overwriting function, the cache replacement request (Replace 3) can be retained in the loop-back section queue 143 at time #4 by overwriting it even if the loop-back section queue 143 has no space as illustrated in FIG. 10B. At this point, the cache replacement request (Replace 1) is lost due to overwriting, but it does not lead to a problem as long as the system implements Eviction function. The read request corresponding to the overwritten cache replacement request (Replace 1) is handled as a read request that does not have a cache replacement request. The read request (Read 1) is output onto the local bus 300 at time #5.

Thus, when the loop-back section queue 143 has overwriting function, it is possible to expedite issuance of a read request even when the loop-back section queue 143 has no space. Also, when the loop-back section queue 143 has overwriting function, the capability to issue a read request does not reduce even if a large number of entries are not prepared in the loop-back section queue 143. On the contrary, if the loop-back section queue 143 has many entries, requests would stay in the queue 143 for a longer time and consequently a cache replacement request might be processed after a parent read request that goes through the global bus 301. Accordingly, the number of entries of the loop-back section queue 143 is preferably less.

While the embodiment of the present invention has been described, the present invention is not limited thereto. For example, in the above embodiment, if a cache replacement request is newly issued when the loop-back section queue 143 is full, a cache replacement request retained in the loop-back section queue 143 is overwritten with the issued cache replacement request. However, it is also possible to discard the newly issued cache replacement request.

What is claimed is:

1. A multiprocessor system comprising:
   a plurality of system boards each of which has a local bus, CPUs having a local cache respectively, a cache replacement request loop-back circuit and a request handing section for handling requests issued by the CPUs; and
   an address crossbar board that provides a global bus and arbitration of requests from the system boards,
   wherein the cache replacement request loop-back circuit that receives a request issued by a CPU on the same system board, determines whether the received request is a cache replacement request to delete a local cache entry, which request is paired with a read request issued by the CPU, sends the received request other than a cache replacement request via the address crossbar board to the request handling section, stores the received cache replacement request in a queue and sends the received cache replacement request internally to the request handling section on the same system board when there is no valid request on the global bus.

2. The multiprocessor system according to claim 1, wherein the cache replacement request loop-back circuit comprises a loop-back section queue that retains cache replacement requests issued by the CPUs on the same system board.

3. The multiprocessor system according to claim 2, wherein, if a cache replacement request is newly issued by a CPU on the system board when all the entries of the loop-back section queue already retain cache replacement requests, the cache replacement request loop-back circuit overwrites a cache replacement request retained in any one entry of the loop-back section queue with the newly issued cache replacement request.

4. A system board in a multiprocessor system that comprises a plurality of system boards each of which has a local bus, CPUs having a cache respectively and a request handing section for handling requests issued by the CPUs, and an address crossbar board that provides a global bus and arbitration of requests from the system boards, the system board comprising:
   a cache replacement request loop-back circuit, which is provided with each of the system boards, that receives a request issued by a CPU on the same system board, determines whether the received request is a cache replacement request to delete a local cache entry, which request is paired with a read request issued by the CPU, sends the received request other than a cache replacement request via the address crossbar board to the request handling section, stores the received cache replacement request in a queue and sends the received cache replacement request internally to the request handling section on the same system board when there is no valid request on the global bus.

5. The system board according to claim 4, wherein the cache replacement request loop-back circuit comprises a loop-back section queue that retains cache replacement requests issued by the CPUs on the same system board.

6. The system board according to claim 5, wherein, if a cache replacement request is newly issued by a CPU on the system board when all the entries of the loop-back section queue already retain cache replacement requests, the cache replacement request loop-back circuit overwrites a cache replacement request retained in any one entry of the loop-back section queue with the newly issued cache replacement request.

7. A method for handling cache replacement requests by a multiprocessor system that comprises a plurality of system boards each of which has a local bus, CPUs having a local cache respectively and a request handing section for handling requests issued by the CPUs, and an address crossbar board that provides a global bus and arbitration of requests from the system boards, the method comprising:
   receiving a request issued by a CPU on the same system boards;
   determining whether the received request is a cache replacement request to delete a local cache entry, which request is paired with a read request issued by the CPU;
   sending the received request other than a cache replacement request via the address crossbar board to the request handling section;
   storing the received cache replacement request in a queue; and
   sending the received cache replacement request internally to the request handling section on the same system board when there is no valid request on the global bus.

8. The cache replacement request handling method according to claim 7, further comprising the step of retaining the issued request in a loop-back section queue provided on that system board before sending it to the request handling section if the issued request is a cache replacement request.

9. The cache replacement request handling method according to claim 8, wherein, when the all entries of the loop-back section queue already retain cache replacement requests, the step of retaining the issued request in the loop-back section queue overwrites a cache replacement request retained in any one entry of the loop-back section queue with the issued cache replacement request.

* * * * *